United States Patent [19]

[11] 4,328,268

[45] May 4, 1982

Tsuji et al.

[54] TRANSFER MATERIAL FOR SEAMLESS COLORATION OF CYLINDRICAL ARTICLE

[75] Inventors: Yoshiharu Tsuji; Shigekazu Namura, both of Kyoto, Japan

[73] Assignee: Nissha Printing Co., Ltd., Kyoto, Japan

[21] Appl. No.: 109,568

[22] Filed: Jan. 4, 1980

Related U.S. Application Data

[63] Continuation-in-part of Ser. No. 889,384, Mar. 23, 1978, abandoned.

[30] Foreign Application Priority Data

Apr. 1, 1977 [JP] Japan ................................. 52/37775

[51] Int. Cl.[3] ................................................ B32B 3/00

[52] U.S. Cl. ..................................... 428/40; 156/230; 428/156; 428/207; 428/913; 428/914

[58] Field of Search ................. 428/156, 40, 454, 530, 428/913, 200, 914, 202, 198, 90, 95, 88, 60, 58, 63, 207, 195; 156/230, 239, 240

[56] References Cited

U.S. PATENT DOCUMENTS

| | | | |
|---|---|---|---|
| 2,746,893 | 5/1956 | Matthes | 428/202 |
| 2,803,283 | 8/1957 | Graber | 428/63 X |
| 2,833,327 | 5/1958 | Boyce | 428/63 X |
| 3,007,829 | 11/1961 | Akkeron | 156/230 X |
| 3,065,120 | 11/1962 | Avelar | 428/454 |
| 3,449,186 | 6/1969 | Rano | 428/60 X |
| 3,459,626 | 8/1969 | Morgan | 428/40 |

*Primary Examiner*—Thomas J. Herbert, Jr.

*Attorney, Agent, or Firm*—Wegner & Bretschneider

[57] ABSTRACT

In a transfer material for coloring a circumferential surface of an article, which includes a releasable base sheet and an adhesively transferable ink layer; the improvement comprising: said ink layer being formed by printing an ink containing a resinous binder and at least one coloring agent therein on the surface of said base sheet as continuously reducing the amount of the ink per unit area to its both ends.

8 Claims, 8 Drawing Figures

TRANSFER MATERIAL FOR SEAMLESS COLORATION OF CYLINDRICAL ARTICLE

This application is a continuation-in-part application of application Ser. No. 889,384 filed Mar. 23, 1978, now abandoned.

This invention relates to a transfer material for seamless coloration of the circumferential surface of a cylindrical article, in particular, a circular cylindrical article.

Dry transfer materials which heat-transfer under pressure an ink layer onto articles to be transferred or wet transfer materials which slidingly transfer an ink layer on articles to be transferred upon dissolution of a water soluble stripping layer with water have heretofore been employed widely for the transferring coloration of the surfaces of cylindrical articles.

In the transfer patterning on the circumferential surface of the cylindrical articles by the use of such conventional transfer materials, since the ink layer of the transfer materials is printed in a pattern and a size adjusted to the peripheral length of standard articles to be transferred, a problem, however, arises in that seams are resulted between a transfer starting portion and a transfer end portion which causes a significant reduction in the commercial values of transferred products. Namely, such seams can not align to each other because of the difference in the peripheral length of individual transferred articles or of the expansion or contraction in the transfer materials to result in discontinuity which forms portions utterly lacking of ink impressions or to cause the ink impressions to be overlapped to each other to double the amount of the ink per unit area. Conspicuous protrusion of the seams has thus been inevitable.

Accordingly, it is an object of this invention to provide a transfer material for applying a seamless pattern on the circumferential surface of an article in a form of circular cylinder, pillar or the like.

Further objects, features and attending advantages of the invention will become apparent by reference to the following detailed description and accompanying drawings, in which.

Figure 1:
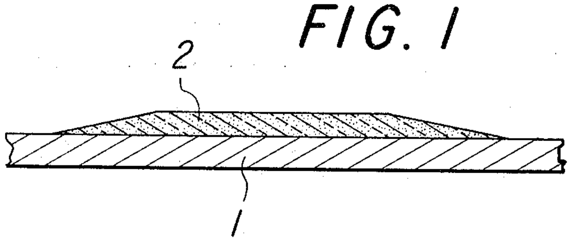
FIG. 1 is an enlarged schematic sectional view of one embodiment of the transfer material according to this invention.
Figure 2:
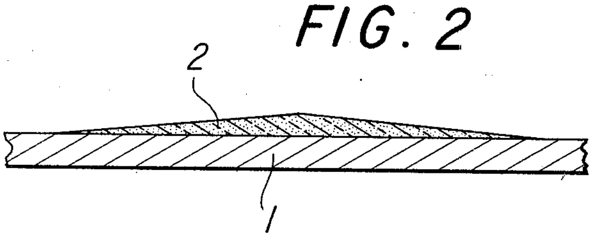
FIG. 2 is an enlarged schematic sectional view of another embodiment of the transfer material according to this invention.

With reference to FIG. 1 or 2, the transfer material of this invention comprises a base sheet 1 consisting of a film such as polyester, cellophane or the like, paper such as parchment paper, coated paper or the like, or laminated sheet formed therewith and an adhesively transferable ink layer 2, formed thereon by way of printing such as gravure, offset, flexographic, silk screen techniques and the like as continuously reducing the amount of the ink per unit area to its both ends. Thus formed ink layer 2 is partially or entirely overlapped when transferred on the circumferential surface of an article to be transferred and can provide the transferred pattern having the adjusted amount of the ink per unit area even in the overlapped portions of the ink layers and thereby to provide a seamless coloration on the surface of the article.

The binder used for the transferable ink layer 2 is selected from the resins of the type which is possessed of both adhesiveness to the object to be transferred and releasability from the base sheet in the transferring operation. Examples of such resins include butyral resin, thermoplastic acrylic resin, thermosetting acrylic resin, and other synthetic resins such as polyvinyl chloride, polystyrene, polyamide or acrylonitrile-styrene copolymers, and these resins may be used either singly or in admixture with natural resin.

Figure 3:
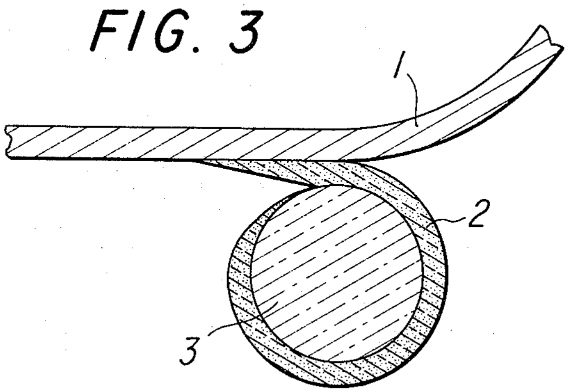
FIG. 3 is an enlarged schematic sectional view for the illustration of a transfer process using the transfer material according to this invention.
Figure 4:
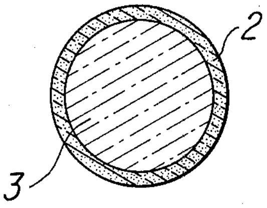
FIG. 4 is an enlarged schematic sectional view of an article transferred with a pattern from the transfer material according to this invention.
Figure 5:
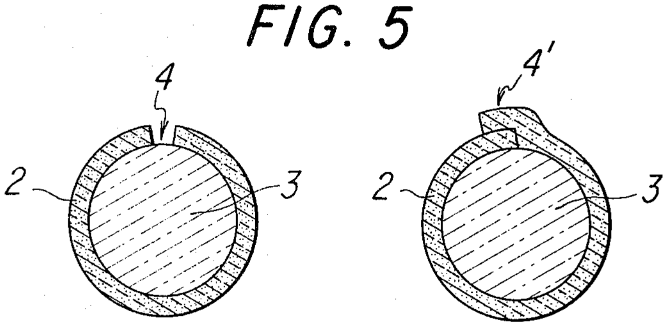
FIG. 5 is an enlarged schematic sectional view of an article transferred with a pattern by way of the prior art.

In the transferring process, the transfer material is placed on the circumferential surface of a cylindrical article 3 to be transferred as shown in FIG. 3 and then the adhesively transferable ink layer 2 is transferred onto the circumferential surface of the article by applying heat and/or pressure onto the outer surface of the base sheet while overlapped at least partially in the lengthwise direction of the layer to attain seamless patterning on that surface as shown in FIG. 4. While on the other hand as shown in FIG. 5, seamed portion 4 or 4' is inevitably formed by the similar operation carried out using a transfer material of the prior art wherein the amount of the ink per unit area is not adjusted previously throughout the entire length of the layer.

It should be appreciated in FIGS. 1 to 5 that the thickness of the adhesively transferable ink layer 2 illustrates schematically the amount of the ink per unit area printed on the base sheet.

As apparent from the foregoings, this invention is also applicable with ease to various types of dry heat transfer materials, wet transfer materials or pressure-sensitive transfer materials well known in the art without departing from the spirit of the invention and hence it should be understood that this invention is no way restricted only to specific transfer materials.

For instance, a so-called stripping layer made of releasable polymer material or water soluble material (in wet type) may further be provided between the base sheet 1 and the ink layer 2 or releasing substance such as silicon or wax may be coated on the inner surface of the base sheet 1 where the releasability between the sheet 1 and the layer 2 is poor. Furthermore, where the ink layer 2 has only an insufficient bondability to the article to be transferred, an adhesive layer consisting of adhesive substance may be provided on the outer surface of the layer 2.

Some examples of transfer materials to which the invention can be applied are shown in the specifications of U.S. Pat. Nos. 2,283,480; 2,688,579; 3,007,829; 3,065,120; 3,067,054; 3,275,465; 3,298,850; 3,432,376; 3,459,626, etc.

In the specific case, the materials used for forming the heat-sensitive transfer material which is especially suitable for multi-color dyeing anodized aluminum surface and disclosed in the specification of the applicant's copending U.S. patent application Ser. No. 856,102 entitled "Multi-color dyeing of shaped and anodized aluminum articles", filed on Nov. 30, 1977, now abandoned may be digested as follows:

BASE SHEET

The base sheet may be made of a plastic material such as polyester, nylon, polypropylene, polyethylene, cellophane, etc., a paper material such as parchment paper, craft paper, coated paper, etc., or composites thereof, or any of these sheet materials provided with a releasing treatment such as silicon treatment or waxing.

INK LAYER

The binder of the ink is made of a resin such as for example: acrylic resin, polystyrene, acrylonitrile-styrene copolymers, acrylonitrile-butadiene-styrene copolymers, polyvinyl chloride, polyvinyl chloride-polyvinyl acetate copolymers, polyamide, polyurethane, chlorinated rubber, cyclized rubber, rosin type resins, cellulose type resins, etc.

The coloring agents of the ink include the following: acid dyes such as C.I. Acid Yellow 17, C.I. Acid Red 80, C.I. Acid Blue 25, C.I. Acid Black 1, etc.; metal complex (oil-soluble alloy) dyes such as C.I. Solvent Yellow 19, C.I. Solvent Red 8, C.I. Solvent Blue 25, C.I. Solvent Black 22, etc.; oil-soluble dyes such as C.I. Solvent Yellow 15, C.I. Solvent Red 30, C.I. Solvent Blue 11, C.I. Solvent Black 3; direct dyes such as Congo Red; mordant eyes such as alizarin; disperse dyes such as C.I. Disperse Yellow 64, Miketon Yellow 3G (Mitsui Toatsu), C.I. Disperse Red 59, Kayaset Red B (Nippon Kayaku), C.I. Disperse Blue 95, C.I. Disperse Violet 27, PTB 54 Black (Mitsubishi Kasei), etc.; and food dyes such as C.I. Food Yellow C, C.I. Food Red 7, C.I. Food Blue 1, etc.

ADHESIVE LAYER

A resin of the type same as used for said ink layer binder is spread to the thickness of less than 10μ, preferably less than 3μ. A resin with excellent dye penetrability is selected. In case of using a resin having adhesiveness at normal temperature for the adhesive layer, releasing paper is temporarily provided on the adhesive layer. In case the resin binder used for the ink layer has adhesiveness to the anodized aluminum surface, said adhesive layer may be unnecessitated.

STRIPPING LAYER

The resins of the type releasable from the base sheet, such as polystyrene, polyamide, ethylene copolymers, acrylonitrile-styrene copolymers, acrylonitrile-butadiene-styrene copolymers polyvinyl chloride, polyvinyl chloride-polyvinyl acetate copolymers, methyl methacrylate, methyl acrylate, polyurethane, polyvinyl pyrrolidone, polyvinyl alcohol, cellulose resin, chlorinated rubber, cyclized rubber, melamine, etc., may be used either singly or in combination. In case both of the base sheet and the ink layer described above have releasability, the stripping layer may be omitted.

Meanwhile, where the invention is intended to be applied to a wet type transfer material, the ink binder or stripping layer of the transfer material is made, as well known, from water soluble material such as gelatin, carboxy methyl cellulose, polyvinyl alcohol, starch, casein, gum, sodium alginate, and polyethylene glycol.

Further, appropriate after-treatments can be applied upon use to the transfer material of this invention depending on the ink composition and the type of the transfer material.

These after-treatments include, for example, heat treatment where the ink binder is made of a thermosetting resin and the article to be transferred is of a heat resistant material, dyeing treatment, pore sealing and the like where the coloring components are alumite coloring dyes and the article to be transferred is anodized aluminum and sintering treatment where the coloring components are inorganic pigments, frits and the likes and the article to be transferred is ceramic material such as glass, pottery, enamel and the like.

In order to give those skilled in the art a greater appreciation of the art and a better understanding of the invention, the following examples are to be given:

EXAMPLE 1

Multi-color gravure printing was carried out on a polyester film of 25μ thickness to obtain a transfer material for endless patterning by using a transferable ink layer 135 mm in length and 54 mm in width whose ink amount per unit area was continuously reducing to its both ends as shown in FIG. 2 and having the following composition:

| Yellow ink | Weight part |
|---|---|
| Neo Zapon Yellow GR (BASF) | 6 |
| Vinylchloride-vinylacetate copolymer resin | 30 |
| MEK (methyl-ethylketone) | 32 |
| IPA (isopropylalcohol) | 32 |

Blue ink

Neo Zapan Blue FLE (BASF)

Binder and solvent composition were the same as in the yellow ink.

Red ink

Oleozol Red BL (Sumitomo Kagaku)

Binder and solvent composition were the same as in the yellow ink.

Figure 6:
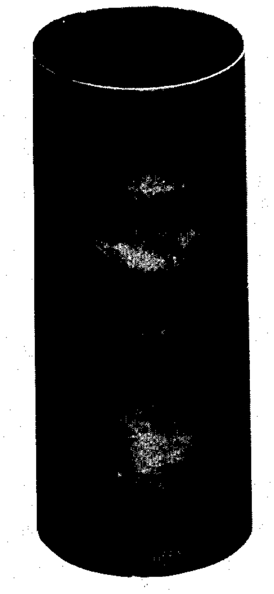
FIG. 6 is a photograph of an anodized aluminum tube transferred with a pattern which is obtained in Example 1 of the invention.

The above transfer material for endless patterning was overlapped on the surface of an anodized aluminum tube 21.5 mm in diameter and 49 mm in width and the transfer was effected by a roller transfer machine at 230° C. and at a speed of 12 cm/sec. in such a way that the layer was entirely overlapped to migrate to the surface of the anodized aluminum tube. Then, heat treatment was conducted to the article to be transferred for 3 minutes at 200° C. to migrate the dyes in the layer into the anodized aluminum membrane followed by pore sealing treatment by immersing the anodized aluminum tube in a boiling aqueous solution of nickel acetate for 5 minutes and then the ink layer was removed by buffing. As the result, an anodized aluminum tube having an endless multi-color pattern quite free from seams was obtained as shown in FIG. 6.

COMPARISON EXAMPLE

Figure 7:
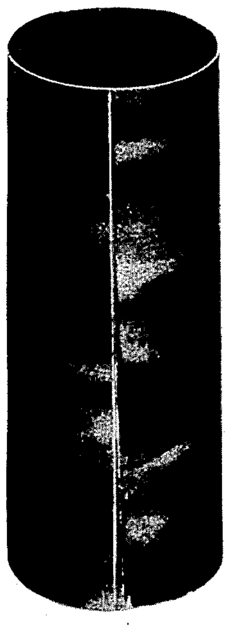
FIG. 7 and FIG. 8 are photographs of anodized aluminum tubes transferred with patterns obtained in a comparison example to be referred to later.
Figure 8:
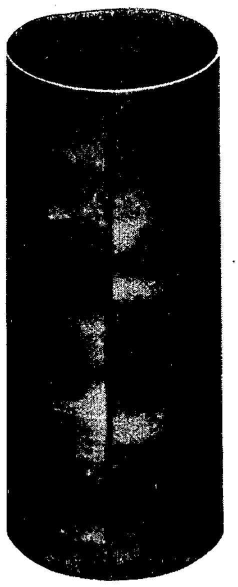

The same transferring operation as in Example 1 was conducted to an anodized aluminum tube using a transfer patterning material printed with an ink layer of 67.5 mm in length and 54 mm in width while without adjusting the amount of the ink per unit area through the length of the ink layer. Discontinuity in the pattern was resulted in the product when the operation was carried under the tension-free state of the transfer patterning material as shown in FIG. 7, while on the other hand, the applied pattern was overlapped to double the ink concentration when the transfer patterning material was stretched by the strong tension applied thereto through the operation as shown in FIG. 8.

EXAMPLE 2

A laminated film consisting of a polyester film of 16μ thickness and a polypropylene film of 20μ thickness was printed, at its polypropylene film surface, with a multicolor pattern ink layer of 41.4 mm in length and 50.0 mm in width whose ink amount per unit area was continuously reduced along 10 mm portions at its both ends to obtain a patterning material by using an ink of the following composition:

| | Weight part |
|---|---|
| C.I. Acid Red 80 | 10 |
| Methylmethacrylate | |
| (Mitsubishi Rayon BR-50, s.p. 100° C.) | 10 |
| Methanol | 60 |
| Ethanol | 20 |
| C.I Acid Blue 25 | 10 |
| Resin and solvent composition were same as above. | |
| C.I. Acid Yellow 17 | 10 |
| Resin and solvent composition were same as above. | |

The seamless transfer material was overlapped on the surface of an anodized aluminum tube 10 mm in outer diameter and transferred by a roller transfer machine at a temperature of 200° C. and at a speed of 10 cm/sec. in such a way that the patterning ink layer was partially overlapped (in 10 mm) to migrate onto the surface of the anodized aluminum tube. Then, steam treatment was effected thereto for 25 minutes in a pressure vessel at 120° C. to simultaneously carry out dyeing and pore sealing. After that, the unnecessary pattern ink layer remaining on the surface of the anodized aluminum tube was removed dissolved in trichlene. As the result, an aluminum tube having a seamless pattern was obtained.

EXAMPLE 3

A polyester film 25μ in thickness was applied on one side thereof with a stripping layer of 3μ thickness made of an acrylic resin (Acrypet VH, Mitsubishi Rayon, s.p. 100° C.) and printed in multi-color, further thereon, with a patterning ink layer 135 mm in length and 54 mm in width whose ink amount per unit area was continuously reduced from its lengthwise center to both ends to obtain a seamless patterning material by using an ink having the following composition:

| | Weight part |
|---|---|
| Neo Zapon Yellow GT (BASF) | 6 |
| Vinylchloride-vinylacetate copolymer | |
| (Fostaflex M 131, Hochst s.p. 120° C.) | 30 |
| MEK | 32 |
| IPA | 32 |
| Neo Zapon Blue FLE (BASF) | |
| Binder and solvent composition were same as above. | |
| Oleozole Red BL (Sumitomo Kagaku) | |
| Binder and solvent composition were same as above. | |

The above seamless patterning material was overlapped on the surface of an anodized aluminum tube 21.5 mm in outer diameter and 50 mm in width and transferred by a roller transfer machine at a temperature of 230° C. and at a speed of 12 cm/sec. in such a way that the patterning ink layer was entirely overlapped to migrate onto the surface of the anodized aluminum tube. Then, heat treatment at 200° C. was applied thereto for 3 minutes to migrate the dyes contained in the patterning layer into the anodized aluminum membrane. Then, pore sealing was effected by immersing the anodized aluminum tube in a boiling aqueous solution of nickel acetate for 5 minutes and the patterning layer was therefore removed by buffing. As the result, an aluminum tube having a seamless pattern was obtained.

EXAMPLE 4

A polyester film of 25μ thickness applied with wax releasing treatment was provided at its wax coated surface with a releasing layer of 2μ thickness made of an acrylonitrile-styrene copolymer (AS-bl-NT, Shin Nittetsu Kagaku, s.p. 86° C.), imprinted thereon with a patterning ink layer 714 mm in length and 60 mm in width whose ink amount per unit area was continuously reduced along 20 mm length at its both ends by using an ink having the following composition and further provided thereon with an adhesive layer of 3μ thickness made of an acrylic resin (Aromatex 894, Mitsui Toatsu) to obtain a seamless patterning material.

| | Weight part |
|---|---|
| C.I. Dispersion Red 59 | 10 |
| Cellulose acetate butyrate | |
| (EAB-381, Eastman Chemical, s.p. 184° C.) | 10 |
| MEK | 40 |
| Toluene | 40 |
| C.I. Dispersion Blue 95 | |
| Binder and solvents were same as above. | |
| C.I. Dispersion Yellow 64 | |
| Binder and solvents were same as above. | |

The above patterning material was transferred onto an anodized aluminum tube of an elliptic section 514 mm in outer periphery and 55 mm in width in the same manner as in Example 2, and then subjected to heating, pore sealing and buffing. As the result, an aluminum tube of an elliptic section having a seamless pattern on the circumferential surface was obtained.

What is claimed is:

1. In the transfer material for coloring a peripheral surface of an article which includes a releasable base sheet and an adhesively transferable ink layer on said sheet, the improvement wherein the ink layer is formed by printing an ink containing a resinous binder and at least one dyestuff permeable into a surface of said article by heating, the length of said ink layer on the base sheet is more than the peripheral length of said article so as to cause both ends of said ink layer to overlap when the surface of said base sheet is wound upon said surface of said article, the amount of ink per unit area in said ink layer being continuously reduced in both ends of the overlap portion so as to provide a seamless coloration on said surface of said article after said ink layer is transferred thereto.

2. The transfer material of claim 1, in which the amount of ink per unit area of said ink layer is reduced in both of its end ranges.

3. The transfer material of claim 2, in which the amount of ink per unit area of ink layer is reduced from its lengthwise center to both ends thereof.

4. The transfer material of claim 1, in which a stripping layer made of a polymer material releasable from the base sheet or of a water soluble material is provided between the base sheet and the ink layer.

5. The transfer material of claim 4, in which said ink layer contains at least one dyestuff suitable for dyeing a surface of an article such as porous anodized aluminum, by heating said article after said dyestuff is transferred thereonto, the dyestuff being a dye selected from the groups consisting of acid dyes, metal complex dyes, direct dyes, mordant dyes, disperse dyes and dyes for food.

6. The transfer material of claim 5, in which the amount of the ink per unit ares of ink layer is reduced in its both end ranges.

7. The transfer material of claim 1, suitable for use in multi-color dyeing of a surface of a cylindrical article, which comprises a releasable thin base sheet, an adhesively transferable layer formed by multi-printing upon said base sheet a design print of inks containing multi-dyestuffs compatible with said article and dispersed in a thermoplastic or heat-polymerisable resinous binder.

8. The transfer material of claim 7, in which the amount of ink per unit area of said ink layer is reduced in both of its end ranges.

* * * * *